(12) United States Patent
Balakrishna (10) Patent No.: US 12,309,624 B2
(45) Date of Patent: May 20, 2025

(54) RESPONDING TO DEVICE-REPORTED EVENTS IN A NETWORK USING MODIFIED IDENTIFIERS SYSTEMS AND METHODS

(71) Applicant: T-Mobile USA, Inc., Bellevue, WA (US)

(72) Inventor: Reman Pezhumkad Balakrishna, Nutley, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 451 days.

(21) Appl. No.: 17/900,826

(22) Filed: Aug. 31, 2022

(65) Prior Publication Data
US 2024/0073717 A1  Feb. 29, 2024

(51) Int. Cl.
*H04W 24/08* (2009.01)
*H04W 24/02* (2009.01)
*H04W 60/04* (2009.01)

(52) U.S. Cl.
CPC ........... *H04W 24/08* (2013.01); *H04W 24/02* (2013.01); *H04W 60/04* (2013.01)

(58) Field of Classification Search
CPC ...... H04W 24/08; H04W 24/02; H04W 60/04
See application file for complete search history.

(56) References Cited

U.S. PATENT DOCUMENTS

| | | | |
|---|---|---|---|
| 8,868,722 B2 | 10/2014 | Giese et al. | |
| 9,230,106 B2 | 1/2016 | Eliseev et al. | |
| 9,251,506 B2 | 2/2016 | Benjamin et al. | |
| 9,445,236 B2 | 9/2016 | Aleksy et al. | |
| 9,830,397 B2 | 11/2017 | Sadovsky | |
| 9,942,779 B1 | 4/2018 | Proctor et al. | |
| 10,148,685 B2 | 12/2018 | Hassanzadeh et al. | |
| 10,303,817 B2 | 5/2019 | Sebastian et al. | |
| 10,341,856 B2 | 7/2019 | Weinberg et al. | |
| 10,499,294 B1 | 12/2019 | Tayal et al. | |
| 10,600,119 B2 | 3/2020 | Barnett et al. | |
| 10,628,775 B2 | 4/2020 | Gauthier et al. | |

(Continued)

FOREIGN PATENT DOCUMENTS

| CN | 100387092 C | 5/2008 |
|---|---|---|
| CN | 107533504 A | 1/2018 |

(Continued)

*Primary Examiner* — Farid Seyedvosoghi
(74) *Attorney, Agent, or Firm* — Perkins Coie LLP (57) ABSTRACT

Systems and methods for reporting events or scenarios to a telecommunications network are disclosed. A mobile device stores an international mobile station equipment identity software version (IMEISV), which includes digits representing a software version number (SVN). The mobile device identifies an occurrence of an event or a scenario, such as an error condition, presence of the mobile device in a predefined geographic location, or an indication that device security has been compromised. The mobile device correlates the event or the scenario to a set of digits indicating the occurrence of the event or scenario and modifies the IMEISV to replace the SVN with the set of digits. During a subsequent Attach procedure or Tracking Area Update procedure, the mobile device provides the modified IMEISV to a telecommunications network, which can use the modified IMEISV to identify the occurrence of the event or scenario and take one or more actions.

20 Claims, 6 Drawing Sheets

(56) References Cited

U.S. PATENT DOCUMENTS

| | | |
|---|---|---|
| 10,652,744 B2 | 5/2020 | Avasarala et al. |
| 10,742,485 B2 | 8/2020 | Rácz et al. |
| 10,839,042 B1 | 11/2020 | Dias et al. |
| 10,873,865 B2 | 12/2020 | Chandrane et al. |
| 11,070,968 B2 | 7/2021 | Hadadi et al. |
| 11,146,912 B1 | 10/2021 | Portocarrero et al. |
| 11,182,220 B2 | 11/2021 | Wiggers et al. |
| 11,323,304 B2 | 5/2022 | Dutta et al. |
| 2011/0167357 A1 | 7/2011 | Benjamin et al. |
| 2015/0111533 A1* | 4/2015 | Chandramouli ...... H04W 12/12 455/410 |
| 2015/0181462 A1 | 6/2015 | Iwai et al. |
| 2015/0195721 A1 | 7/2015 | Costelloe |
| 2016/0292065 A1* | 10/2016 | Thangamani ....... G06F 11/3616 |
| 2019/0287130 A1 | 9/2019 | Lesko et al. |
| 2020/0033952 A1* | 1/2020 | Pantelopoulos ..... A61B 5/6802 |
| 2020/0272518 A1 | 8/2020 | Chen et al. |
| 2020/0342759 A1 | 10/2020 | Moncomble |
| 2021/0266892 A1* | 8/2021 | Bergquist .............. H04W 76/20 |
| 2021/0343177 A1 | 11/2021 | Coppersmith |

FOREIGN PATENT DOCUMENTS

| | | |
|---|---|---|
| CN | 109144870 B | 7/2020 |
| CN | 112242991 A | 1/2021 |
| CN | 110121154 B | 7/2021 |
| CN | 111742540 B | 9/2021 |
| CN | 113826092 A | 12/2021 |
| CN | 110638422 B | 7/2022 |
| EP | 2883405 A2 | 6/2015 |
| EP | 2949144 A2 | 12/2015 |
| EP | 3014555 A2 | 5/2016 |
| EP | 3384720 A1 | 10/2018 |
| EP | 3164663 B1 | 11/2019 |
| EP | 2836910 B1 | 2/2020 |
| EP | 3627790 A1 | 3/2020 |
| EP | 3718287 A1 | 10/2020 |
| JP | 2021044013 A | 3/2021 |
| KR | 100985749 B1 | 10/2010 |
| KR | 101029332 B1 | 4/2011 |
| KR | 20140053542 A | 5/2014 |
| WO | 2021037812 A1 | 3/2021 |
| WO | 2021047390 A1 | 3/2021 |
| WO | 2021252964 A1 | 12/2021 |

* cited by examiner

RESPONDING TO DEVICE-REPORTED EVENTS IN A NETWORK USING MODIFIED IDENTIFIERS SYSTEMS AND METHODS

BACKGROUND

Current telecommunications technologies and specifications (e.g., 3rd Generation Partnership Project (3GPP) specifications) provide limited options for reporting events or scenarios by a mobile device or other user equipment (UE) to a telecommunications network. For example, UE measurement reporting allows a Universal Terrestrial Radio Access Network (UTRAN) to receive real-time knowledge of conditions measured by a UE by defining events that trigger measurement reports to be sent from the UE. The reports contain information for the UTRAN to perform a handover evaluation.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications service providers provide one or more networks via which mobile devices and other user equipment (UE) access services. Telecommunications service providers and other providers of networks face difficult technical challenges related to determining the occurrence of various events and/or scenarios associated with UEs that access the networks. These events or scenarios can relate to, for example, an operational state of a UE and/or hardware or software components of a UE, occurrence of certain normal or abnormal call flows, one or more indications of a compromised device, and/or other events or scenarios. Network providers have a need to detect events or scenarios to appropriately respond to the events or scenarios, such as by terminating access to a network, adjusting allocations of resources, providing notifications, modifying a device and/or or a network component, and so forth.

Existing systems typically rely on various reporting mechanisms defined in standards or specifications, such as 3GPP specifications, to receive information about events or scenarios and respond to these events or scenarios. But existing systems provide only limited options for a network to receive information about events or scenarios, such as using UE measurement reporting. These existing systems allow networks to learn about only certain predefined events or scenarios.

If reporting of an event or a scenario does not fit within a predefined reporting mechanism, then network providers typically must build a custom reporting mechanism to report the event or scenario, such as using one or more messaging protocols to exchange messages between a UE and the network for the specific purpose of reporting the event or scenario. But these custom reporting mechanisms are inefficient, and they unnecessarily increase usage of network resources. For example, to build a custom reporting mechanism, telecommunications service providers may need to program UEs and/or network components or nodes to send and/or receive customized messages (e.g., text messages) about events or scenarios, and these customized messages use network resources that could otherwise be used for providing services to subscribers. In current systems, a device typically reports an event or a scenario to a telecommunications network provider, but not to the device's operating system (OS) manufacturer (for example, iOS®, Android®), manufacturer (for example, Apple®, Samsung®), and/or other interested parties. Further, older devices are limited to the types of events they can report because of limited device capabilities. For example, current 3G and/or older LTE devices cannot report overheating problems.

Accordingly, there is a need for a technical solution that overcomes the foregoing problems and provides other benefits. For example, there is a need for a solution that allows for reporting of events or scenarios from UEs to networks for which existing specifications or protocols do not provide a reporting mechanism. There is further a need for a solution that takes actions in response to reporting of these events or scenarios. Additionally, there is a need for a solution that allows for reporting of events or scenarios without placing additional strain on network resources, for example, because the reporting of the events or scenarios does not require the use of customized messages and/or other communications that require the use of additional network resources.

Disclosed herein are systems and methods to respond to device-reported events or scenarios in a network using modified identifiers ("system" or "event or scenario reporting system"). A mobile device or other UE stores an identifier, which can be an international mobile station equipment identity software version (IMEISV) including digits representing a software version number (SVN). In response to identifying an occurrence of an event or a scenario, the UE correlates the event or the scenario to a set of digits indicating the occurrence of the event or the scenario. The event or the scenario can be, for example, occurrence of an error condition, presence of the UE in a predefined geographic location, or an indication that security of the UE has been compromised. The UE modifies the IMEISV to replace the SVN with the set of digits indicating the occurrence of the event or the scenario. And the UE provides the modified IMEISV to a telecommunications network in a message or other communication to inform the telecommunications network of the event or the scenario. For example, the UE can provide the IMEISV in a message or communication associated with an Attach procedure or a Tracking Area Update procedure. In response to being informed of the event or the scenario, the telecommunications network can take one or more actions, such as adjusting an allocation of resources to the UE or terminating the UE's access to the telecommunications network.

Advantages of the disclosed technology include providing a mechanism for reporting events or scenarios for which existing specifications or protocols do not provide a mechanism. Additionally, the disclosed technology allows for reporting of these events or scenarios without requiring the use of customized messages or other communications that require the use of additional network resources. For example, the disclosed technology can report events or scenarios via messages or other communications that are already sent as a part of an Attach procedure or a Tracking Area Update procedure. Thus, the disclosed technology reports events or scenarios while also conserving network resources. And the disclosed technology responds to reported events or scenarios in various ways, such as by adjusting allocations of resources and/or terminating access to networks.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Although specific examples are described herein in relation to using a modified IMEISV to report events/scenarios in a telecommunications network, the disclosed technology can also be used to report and respond to events and/or scenarios in other kinds of networks and/or using other kinds of identifiers.

Wireless Communications System

Figure 1:
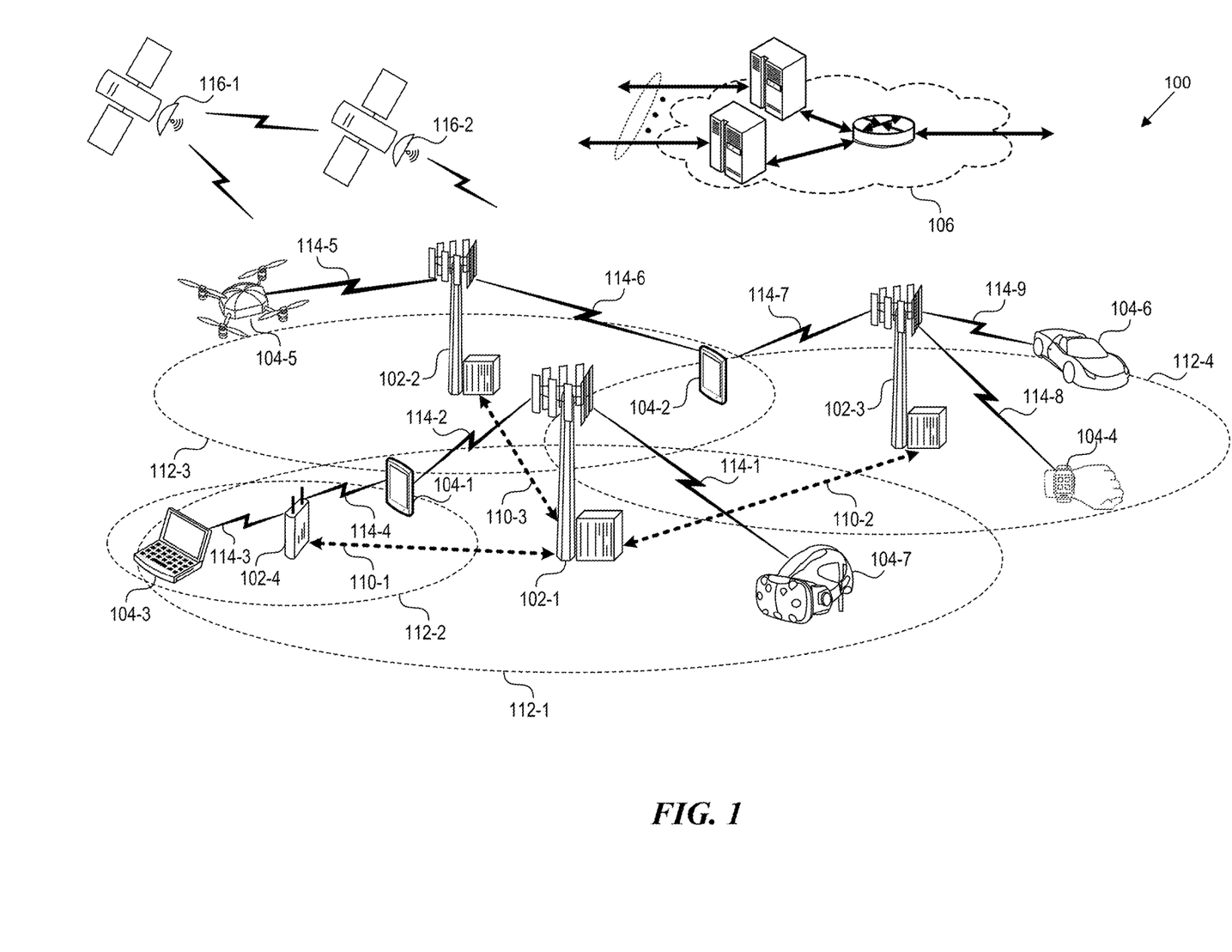
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
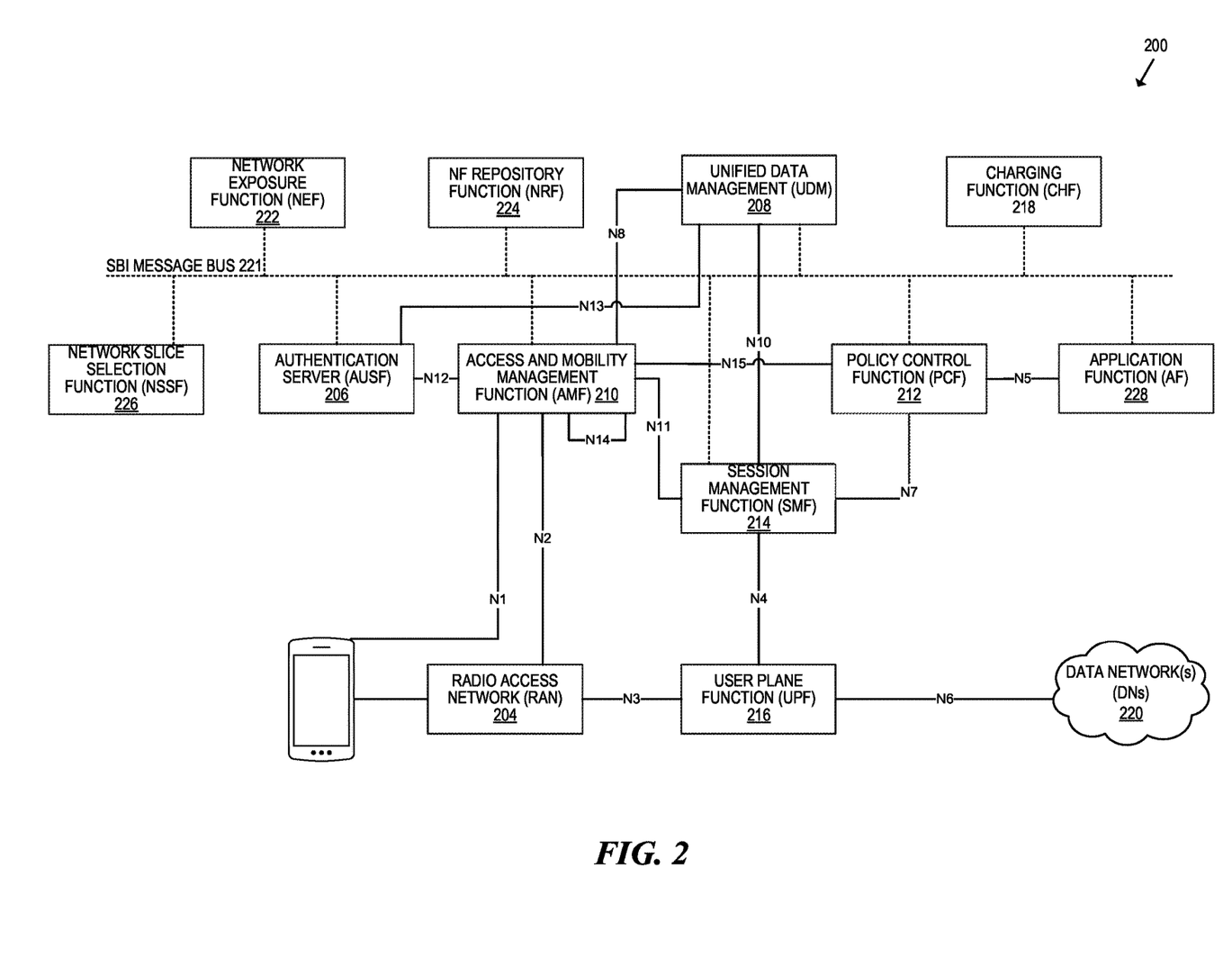
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Schema of Modified Identifier

Figure 3:
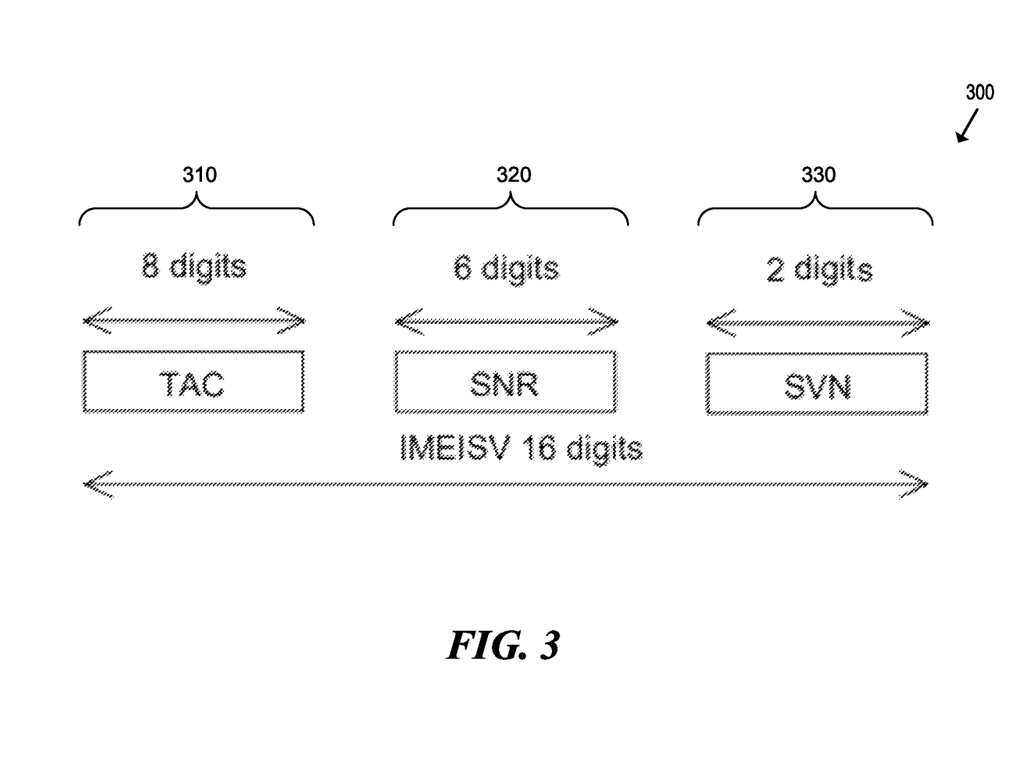
FIG. 3 is a schema that illustrates a modified international mobile station equipment identity software version (IMEISV) in some implementations.

FIG. 3 is a schema 300 that illustrates a modified identifier, which can be a modified international mobile station equipment identity software version (IMEISV), in some implementations. The modified identifier can be used in a network 100 and/or by one or more NFs in the architecture 200, for example, to send and/or receive indications of events or scenarios and/or to determine the occurrence of events or scenarios. The modified identifier can be modified and/or stored by one or more wireless devices 104 in the network 100. The modified identifier can be received by the network 100 via one or more base stations 102.

An IMEISV is a unique identifier residing in and/or stored by a UE to identify the UE. As shown in the schema 300, an IMEISV can be a 16-digit number that is structured in three parts: (1) a Type Allocation Code (TAC) 310 comprising 8 digits, (2) a Serial Number (SNR) 320 comprising a 6-digit serial number to uniquely identify each UE within a common TAC 310, and (3) a software version number (SVN) 330. Together the TAC 310 and the SNR 320 comprise an international mobile equipment identity (IMEI).

In an unmodified IMEISV, the SVN 330 will comprise two digits that indicate software version information for a UE, which is typically determined and provided by a manufacturer of the UE. For example, the manufacturer can allocate a SVN 330 between values of 00 and 98 to indicate a software version, while reserving the SVN 330 value 99 for future use.

However, using the disclosed event or scenario reporting system, the SVN 330 can be modified in response to determining the occurrence of an event or scenario. For example, a UE can be configured to detect occurrence of an event or scenario. In response to detecting the occurrence or the scenario, the UE can retrieve a two-digit number from a data structure storing multiple two-digit numbers each corresponding to a particular event or a particular scenario. The UE can then modify the IMEISV by replacing the SVN 330 with the retrieved two-digit number. In subsequent communications with a network, the UE provides the modified IMEISV to the network instead of providing the unmodified IMEISV. Using the SVN 330 portion of the modified IMEISV, the network can then determine that the event or the scenario has occurred and take one or more actions responsive to the event or the scenario, as will be described herein. In some implementations, a device manufacturer can reserve certain SNRs (e.g. 000000 or 111111), and a device's assigned SNR can be replaced with a certain reserved SNR to indicate the occurrence of an event or scenario. A device's SNR can be modified in tandem with its SVN to represent a greater number of events or scenarios.

Event or Scenario Reporting System

Figure 4:
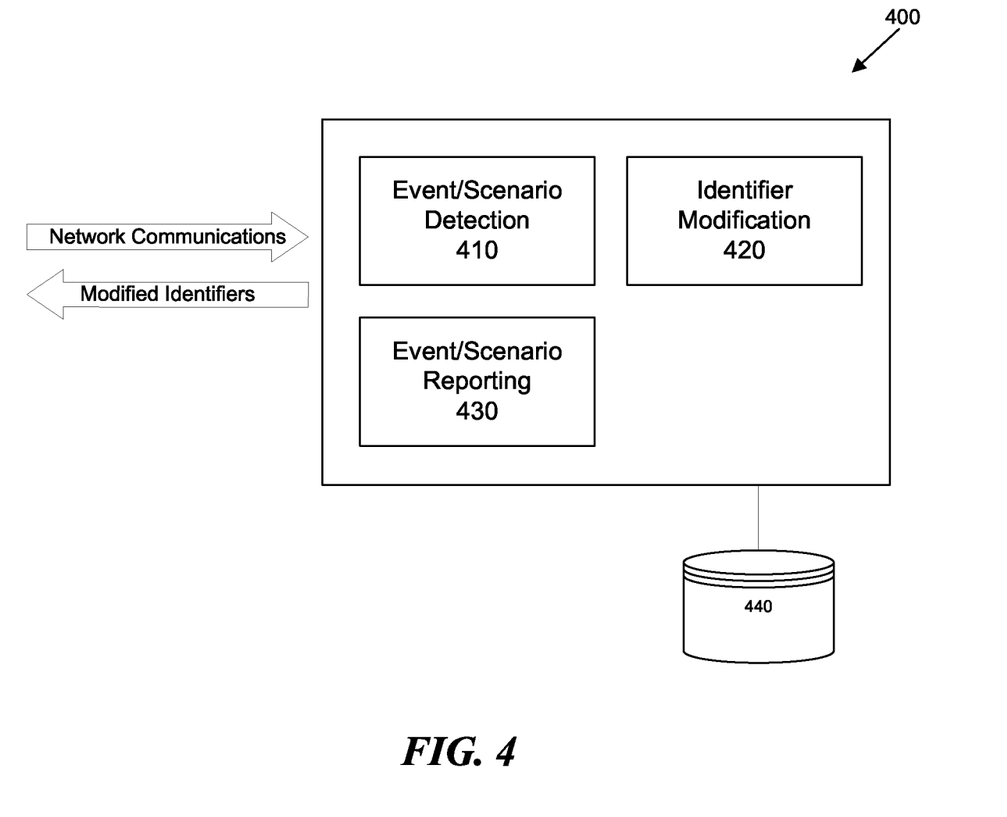
FIG. 4 is a block diagram that illustrates components of an event or scenario reporting system in some implementations.

FIG. 4 is a block diagram that illustrates components of an event or scenario reporting system 400 in some implementations. At least a portion of the system 400 can be provided using a UE, such as a wireless device 104 in the network 100. Additionally, messages or other communications provided by the system can be received by the network 100 via one or more base stations 102.

The system 400 can include functional modules that are implemented with a combination of software (e.g., executable instructions or computer code) and hardware (e.g., one or more memories and one or more processors). Accordingly, as used herein, in some examples a module can be a processor-implemented module or set of code and represents a computing device having one or more processors that are at least temporarily configured and/or programmed by executable instructions carried in one or more memories to perform one or more of the functions described herein.

The system 400 comprises an event/scenario detection module 410, an identifier modification module 420, and an event/scenario reporting module 430, which are each described separately below. Additionally, the system 400 includes a storage component 440, which can be used to store and/or access data for or used by the system 400, such as modified or unmodified identifiers and/or data structures storing information about events and/or scenarios. The storage component 440 comprises one or more of local storage, storage on a server system or on the cloud, or a combination thereof.

Event/Scenario Detection Module

The event/scenario detection module 410 detects/identifies/determines the occurrence of various events or scenarios, such as events or scenarios occurring at a UE and/or a network. Table 1 below illustrates examples of events or scenarios that can be detected and one or more characteristics or indications of each event or scenario. Thus, the event/scenario detection module 410 can detect occurrence of these and other characteristics or indications and identify a corresponding event or scenario based on the characteristics or indications. In some implementations, the event/scenario detection module 410 detects events or scenarios based on one or more threshold conditions, such as by detecting one or more characteristics or indications at least a threshold number of times and/or beyond a threshold level.

TABLE 1

| Event or Scenario | Characteristics or Indications |
| --- | --- |
| Error condition at UE | Error code generated by UE |
| | Error response and/or failure to respond by hardware or software component of UE |
| | Critical alarm at UE |
| Presence of UE in predefined location | Geolocation data provided by UE indicating presence in the predefined location |
| | Connection to a specified node of a network |
| Compromised UE | Abnormal call flows |
| | Network activity exceeding a threshold quantity and/or of an unexpected type |

In some implementations, the system detects events or scenarios based on monitoring of network traffic or packets, such as call drop rate, uplink speed, downlink speed, and so on. The system can further detect events or scenarios based on memory or processor usage by particular applications, modules, or components on the device. For example, the system can detect an event of an overheating device and/or internal hardware problems. As another example, an event or scenario can be when a device is present in a particular geographic area (e.g., a roaming network/region, crossing geographical boundaries, presence in a prohibited/confidential region, and so on). For example, when a IoT device moves to an unauthorized location, an error or scenario may be detected/identified.

The system can further employ a priority associated with the events or scenarios. For example, when multiple events or scenarios occur, the system can identify/select the events or scenarios to report based on their associated priority levels. The priority levels can be preconfigured and/or dynamically configured by the telecommunications provider (e.g., an administrator), based on factors, such as a type of the device, past behavior of the device, location of the device, user profile(s) associated with the device, and so on.

The telecommunication service provider can communicate the event or scenarios and associated detection conditions, for example, as part of software updates/configurations. In some implementations, the telecommunications service provider can turn-on or turn-off the event/scenario detection using carrier configurations. In response to certain events or scenarios, counter actions may be implemented. Some examples include: in response to an internal hardware crash log or alarm, configuring a device not to utilize E-UTRAN New Radio Dual Connectivity (ENDC); in response to a device's operation in a particular band being impaired, configuring it not to utilize that band; in response to continuous voice or video call drops, moving a device to a better performing band; and in response to a device reaching a certain internal temperature (overheating), turning off its ENDC capabilities.

Identifier Modification Module

The identifier modification module 420 modifies one or more identifiers in response to detection of an event or scenario by the event/scenario detection module 410. For example, the identifier modification module 420 can modify a SVN 330 of an IMEISV, as illustrated in the schema 300 of FIG. 3. As described herein above, a SVN typically comprises a two-digit value between 00 and 98 that is provided by a UE manufacturer to indicate software version information for a UE. The identifier modification module 420 can modify and/or replace a SVN in various ways to instead indicate an event or scenario detected by the event/scenario detection module 410. For example, in some implementations, a predetermined range of SVN values can be reserved to indicate an event or scenario, while remaining values can continue to be used to indicate software version information. Thus, unmodified identifiers can still be used to provide software version information, while modified identifiers can be used to indicate occurrence of an event or scenario. Table 2 below illustrates examples of SVN values and corresponding events or scenarios.

TABLE 2

| SVN Value | Event or Scenario |
| --- | --- |
| 00-49 | None - SVN value is unmodified, indicating software version information |
| 50-59 | Error condition at UE (e.g., hardware error, software error disabled circuitry) |
| 60-69 | Presence of UE in predefined location (e.g., at a subscriber location, connected to a particular node) |
| 70-79 | Compromised UE (e.g., stolen device, device conducting suspicious activities) |
| 80-89 | End of event/scenario |

Although particular SVN values and/or value ranges are illustrated in Table 2, other values and/or ranges can be used. In some implementations, a range of values can indicate a particular event or scenario and/or a type or category of event or scenario. In some implementations, specific SVN values indicate specific events or scenarios. For example, a SVN value within a range of 70-79 can indicate a compromised UE, whereas a specific value within that range can provide additional information regarding how the UE is compromised (e.g., 70 can indicate a stolen device, 71 can indicate a hacked device, 72 can indicate a fraudulent device user, and so forth).

Event/Scenario Reporting Module

The event/scenario reporting module 430 reports, to one or more components or nodes of a network, the occurrence of events/scenarios identified using the event/scenario detection module 410. The event/scenario reporting module 430 reports these events and/or scenarios using modified identifiers provided by the identifier modification module 420.

For example, to report an event or a scenario to a network, the event/scenario reporting module 430 can replace an unmodified IMEISV in one or more messages or other communications with a modified IMEISV that indicates the occurrence of the event or the scenario. The messages or communications can relate to, for example, performance of an Attach procedure and/or a Tracking Area Update procedure. Advantageously, the event/scenario reporting module 430 can report events or scenarios using messages or communications that are already being sent to the network. Thus, the system 400 need not generate and send separate communications to inform the network of the events or scenarios, which would require the use of additional network resources. In some implementations, an application on the UE can transmit the modified IMEISV to the telecommunications network, device manufacturer, a third party, and so on. For example, an application executing on the UE can save the modified IMEISV and the application can send it to the telecommunications network, device manufacturer, etc. Alternatively or additionally, the telecommunications network, device manufacturer, third party, etc. can access the modified IMEISV via the application executing on the UE. In the telecommunications network, the modified IMEI can be received and/or interpreted by the Mobile Management Entity (MME), Access and Mobility Function (AMF), the Equipment Identify Register (EIR), or another server configured to process the modified IMEISV.

Thus, when a UE sends a message or communication to commence and/or perform an Attach procedure and/or a Tracking Area Update procedure, one or more components or nodes of a network can receive the message or communication and detect the occurrence of the event or scenario based on the presence of the modified IMEISV (e.g., containing a SVN value as illustrated in Table 2 above). In response to detecting the occurrence of the event or scenario, one or more components or nodes of the network can then take one or more actions to respond to the event or the scenario. For example, if a device has been compromised, the network can terminate network access by the device and/or adjust an allocation of resources to the device (e.g., to prevent the device from using an excessive amount of resources). Additionally or alternatively, the network can generate and send one or more notifications associated with the event or scenario, such as text messages, emails, phone calls, or other communications to a subscriber and/or to a telecommunications service provider to provide information about the event or scenario. For example, when the event indicates that a performance degrade occurred (dropped call), the network can allocate more resources, move to a different band/spectrum/technology (e.g., 4G/5G/6G), and so on. As another example, when the event indicates that the UE is overheating, the network can configure the UE to not use millimeter wave for a certain period of time, which could be resulting in overheating. As another example, when the event indicates that the UE is in a particular geographic area, the network could serve the UE with prioritized (or deprioritized) treatment.

In some implementations, the event/scenario reporting module 430 initiates an Attach procedure or a Tracking Area Update procedure in response to detecting the occurrence of the event or scenario and for the purpose of reporting the event or scenario to the network.

Reporting an Event or Scenario Using a Modified Identifier

Figure 5:
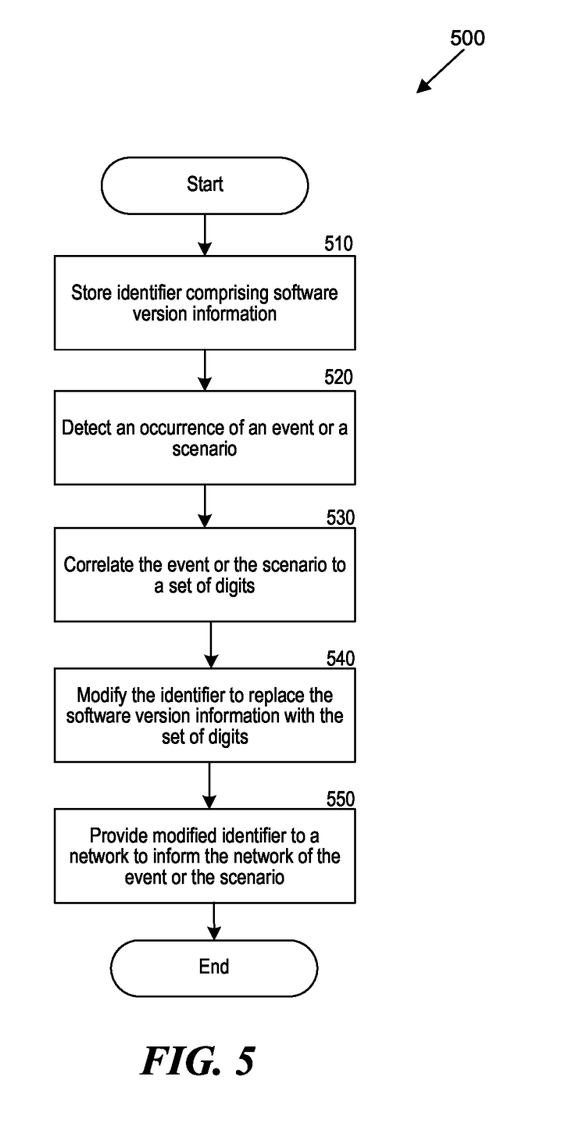
FIG. 5 is a flow diagram that illustrates a process to report an event or scenario using a modified identifier in some implementations.

FIG. 5 is a flow diagram that illustrates a process 500 to report an event or scenario using a modified identifier in some implementations. At least a portion of the process 500 can be performed by the system 400 of FIG. 4. Additionally, the process 500 can be performed by a wireless device 104 to report an event or scenario to the network 100.

The process 500 begins at block 510, where a mobile device or other UE stores an identifier, which can be a modified or unmodified international mobile station equipment identity software version (IMEISV). For example, the identifier can be an IMEISV configured according to the schema 300 of FIG. 3, which includes a SVN 330 comprising consecutive digits that indicate software version information for the UE.

At block 520, the system detects or identifies an occurrence of an event or a scenario. The event or scenario can include one or more of: (1) an occurrence of an error condition at the mobile device, (2) a presence of the mobile device in a predefined geographic location, or (3) an indication that security of the mobile device has been compromised. Additionally or alternatively, the event or scenario can include a normal call flow or an abnormal call flow. Further examples of events or scenarios include failure of a hardware or software component of the UE, occurrence of a critical alarm, and/or disabling circuitry of the UE. In some implementations, detecting the occurrence of the event or the scenario includes detecting a quantity of incidents exceeding a threshold quantity. Events or scenarios can be detected by determining one or more characteristics or indications of the event or scenario.

At block 530, the system correlates the event or the scenario to a set of digits indicating the occurrence of the event or the scenario. For example, the system can access a data structure, such as a database or table, storing information about particular events or scenarios that can be detected and corresponding sets of digits (e.g., pairs of digits) that indicate the occurrence of each particular event or scenario. Each set of digits can be an SVN value, as illustrated in Table 2 above.

At block 540, the system modifies the stored identifier to replace the software version information with the set of digits identified at block 530. For example, the system can modify an IMEISV to replace a SVN portion of the IMEISV with the set of digits indicating the occurrence of the event or the scenario.

At block 550, the UE provides the modified identifier to the network in a message or other communication. For example, a modified IMEISV can be provided to the network in a communication or message associated with an Attach procedure or a Tracking Area Update procedure. The network can then use the modified identifier to determine that the event or the scenario has occurred and to take one or more actions in response to the event or the scenario. For example, a component or node of the network can adjust an allocation of resources to a UE or terminate access by the UE.

Operations can be added to the process 500 and/or omitted from the process 500 while maintaining a similar functionality. Additionally, one or more operations in the process 500 can be repeated and/or performed in a different order, including performing one or more operations in parallel.

In some implementations, the process 500 can further include determining that the event or the scenario has ended and modifying the identifier a second time to indicate the end of the event or the scenario. In these and other implementations, the identifier that has been modified the second time is provided to the network in a subsequent message, which serves to inform the network that the event or the scenario has ended. The network can take further actions in response to the event or the scenario, such as restoring access to the UE, restoring an allocation of resources to the UE, sending a message or alert, and so forth.

Computing System

Figure 6:
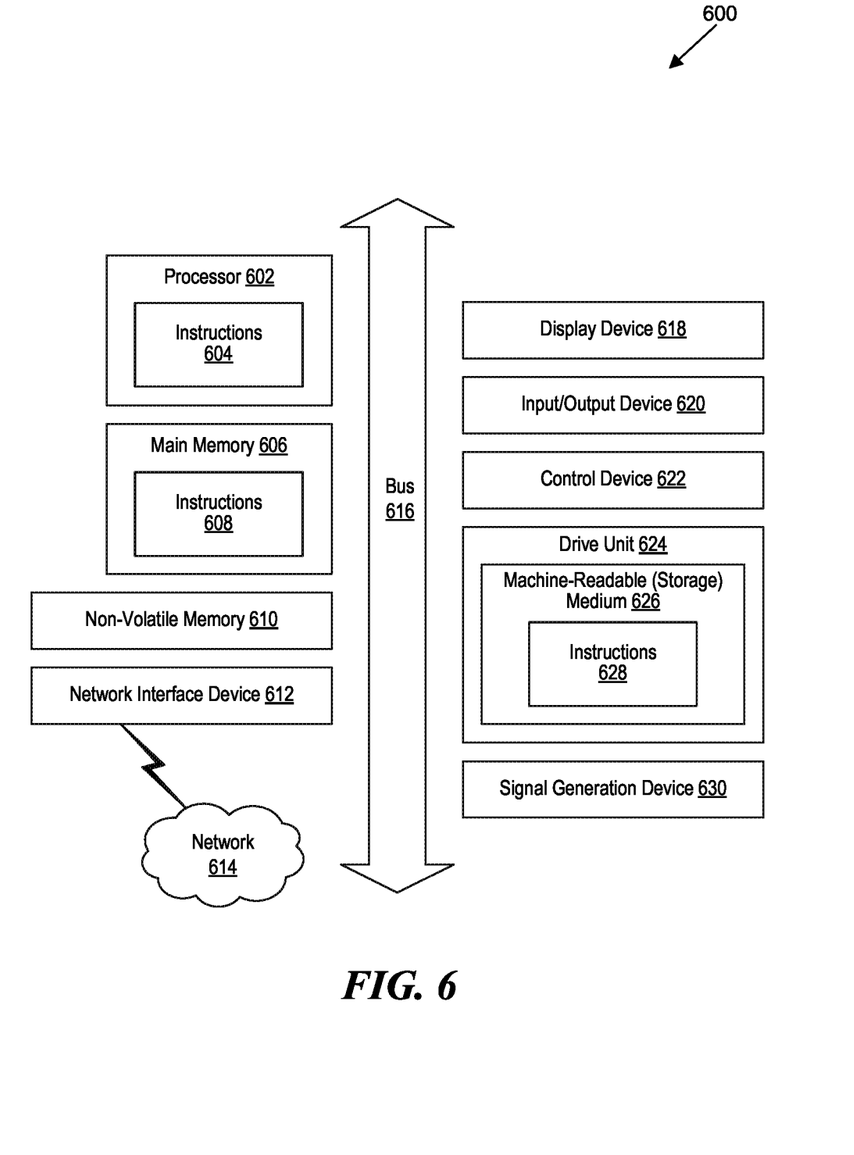
FIG. 6 is a block diagram that illustrates an example of a computing system in which at least some operations described herein can be implemented.

FIG. 6 is a block diagram that illustrates an example of a computing system 600 in which at least some operations described herein can be implemented. As shown, the computing system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computing system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computing systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A mobile device, comprising:
   at least one transceiver;
   at least one hardware processor; and
   at least one non-transitory memory carrying instructions that, when executed by the at least one hardware processor, cause the mobile device to perform operations to identify and report an event or a scenario to a network provided by a telecommunications service provider, the operations comprising:
     storing, in a memory of a mobile device, an international mobile station equipment identity software version (IMEISV),
       wherein at least two consecutive digits of the IMEISV comprise a software version number (SVN) indicating software version information for the mobile device;
     identifying, by the mobile device, an occurrence of an event or a scenario,
       wherein the event or the scenario comprises at least one of:
         an occurrence of an error condition at the mobile device,
         a presence of the mobile device in a predefined geographic location, or
         an indication that security of the mobile device has been compromised;
     correlating the event or the scenario to a set of digits indicating the occurrence of the event or the scenario;
     modifying the IMEISV to replace the SVN with the set of digits indicating the occurrence of the event or the scenario; and
     providing the modified IMEISV to a telecommunications network in a message associated with an Attach procedure or a Tracking Area Update procedure,
       wherein the message informs the telecommunications network of the occurrence of the event or the scenario using the set of digits in the modified IMEISV.

2. The mobile device of claim 1, wherein the operations further comprise:
   initiating, by the mobile device, the Attach procedure or the Tracking Area Update procedure in response to the occurrence of the event or the scenario.

3. The mobile device of claim 1, wherein a component or node of the telecommunications network is configured to adjust an allocation of resources to the mobile device or terminate access by the mobile device in response to the occurrence of the event or the scenario.

4. The mobile device of claim 1, wherein the operations further comprise:
   determining an end of the event or the scenario;
   modifying the IMEISV a second time to indicate the end of the event or the scenario; and
   providing the IMEISV that has been modified the second time to the telecommunications network in a different message.

5. The mobile device of claim 1, wherein the event or the scenario comprises a normal call flow or an abnormal call flow.

6. The mobile device of claim 1, wherein the mobile device identifies the occurrence of the event or the scenario by detecting a quantity of incidents exceeding a threshold quantity.

7. The mobile device of claim 1, wherein the event or the scenario comprises at least one of:
   failure of a hardware component of the mobile device;
   failure of a software component of the mobile device;
   occurrence of a critical alarm; or
   disabling circuitry of the mobile device.

8. A non-transitory computer-readable medium carrying instructions that, when executed by a computing system, cause the computing system to perform operations to identify and report an event or a scenario to a network, the operations comprising:
   storing, in a memory of a user equipment (UE), an international mobile station equipment identity software version (IMEISV),
      wherein at least two consecutive digits of the IMEISV comprise a software version number (SVN) indicating software version information for the UE;
   identifying, by the UE, an occurrence of an event or a scenario,
      wherein the event or the scenario comprises at least one of:
         an occurrence of an error condition at the UE,
         a presence of the UE in a predefined geographic location, or
         an indication that security of the UE has been compromised;
   correlating the event or the scenario to a set of digits indicating the occurrence of the event or the scenario;
   modifying the IMEISV to replace the SVN with the set of digits indicating the occurrence of the event or the scenario; and
   providing the modified IMEISV to a network in a communication,
      wherein the communication informs the network of the occurrence of the event or the scenario using the set of digits in the modified IMEISV.

9. The non-transitory computer-readable medium of claim 8, wherein the operations further comprise:
   initiating the communication to provide the modified IMEISV to the network as part of an Attach procedure or a Tracking Area Update procedure in response to the occurrence of the event or the scenario.

10. The non-transitory computer-readable medium of claim 8, wherein a component or node of the network is configured to adjust an allocation of resources to the UE or terminate access by the UE in response to the occurrence of the event or the scenario.

11. The non-transitory computer-readable medium of claim 8, wherein the operations further comprise:
   determining an end of the event or the scenario;
   modifying the IMEISV a second time to indicate the end of the event or the scenario; and
   providing the IMEISV that has been modified the second time to the network in a different communication.

12. The non-transitory computer-readable medium of claim 8, wherein the event or the scenario comprises a normal call flow or an abnormal call flow.

13. The non-transitory computer-readable medium of claim 8, wherein the UE identifies the occurrence of the event or the scenario by detecting a quantity of incidents exceeding a threshold quantity.

14. The non-transitory computer-readable medium of claim 8, wherein the event or the scenario comprises at least one of:
   failure of a hardware component of the UE;
   failure of a software component of the UE;
   occurrence of a critical alarm; or
   disabling circuitry of the UE.

15. A non-transitory computer-readable medium carrying instructions that, when executed by a computing system, cause the computing system to perform operations to take actions in response to occurrence of an event or scenario associated with a mobile device, the operations comprising:
   receiving, at a node of a telecommunications network and from a mobile device, a modified international mobile station equipment identity software version (IMEISV),
      wherein the modified IMEISV comprise a modified software version number (SVN), and
      wherein the modified SVN has been modified by the mobile device to indicate an occurrence of an event or a scenario;
   accessing a data structure storing multiple modified SVNs and a particular event or a particular scenario corresponding to each of the multiple modified SVNs;
   determining, using the data structure, the particular event or the particular scenario corresponding to the modified SVN included in the modified IMEISV; and
   causing performance of at least one action in response to the determined particular event or the determined particular scenario,
      wherein the at least one action includes adjusting an allocation of resources to the mobile device or terminating access by the mobile device to the telecommunications network.

16. The non-transitory computer-readable medium of claim 15 wherein the determined particular event or the determined particular scenario includes at least one of:
   an occurrence of an error condition at the mobile device,
   a presence of the mobile device in a predefined geographic location, or
   an indication that security of the mobile device has been compromised.

17. The non-transitory computer-readable medium of claim 15, wherein the modified IMEISV is received as part of an Attach procedure or a Tracking Area Update procedure.

18. The non-transitory computer-readable medium of claim 17, wherein the mobile device is configured to trigger the Attach procedure or the Tracking Area Update procedure in response to the occurrence of the determined particular event or the determined particular scenario.

19. The non-transitory computer-readable medium of claim 15, wherein the determined particular event or the determined particular scenario includes at least one of:
   failure of a hardware component of the mobile device;
   failure of a software component of the mobile device;
   occurrence of a critical alarm; or
   disabling circuitry of the mobile device.

20. The non-transitory computer-readable medium of claim 15, wherein the determined event or the determined scenario comprises a normal call flow or an abnormal call flow.

* * * * *